US006491583B1

(12) United States Patent
Gauselmann

(10) Patent No.: US 6,491,583 B1
(45) Date of Patent: Dec. 10, 2002

(54) METHOD FOR DETERMINING THE WINNING VALUE UPON REACHING OF A GAME RESULT AT A COIN OPERATED ENTERTAINMENT AUTOMAT

(75) Inventor: Michael Gauselmann, Espelkamp (DE)

(73) Assignee: Atronic International GmbH, Lübbecke (DE)

(*) Notice: Subject to any disclaimer, the term of this patent is extended or adjusted under 35 U.S.C. 154(b) by 0 days.

(21) Appl. No.: 09/526,109

(22) Filed: Mar. 15, 2000

(30) Foreign Application Priority Data

Jun. 30, 1999 (DE) ........................................ 199 29 865

(51) Int. Cl.⁷ ................................................ A63F 13/00
(52) U.S. Cl. ........................................... 463/20; 463/25
(58) Field of Search ......................... 463/16–21, 25–28; 273/138.1, 138.2, 139

(56) References Cited

U.S. PATENT DOCUMENTS

| | | | | |
|---|---|---|---|---|
| 5,513,846 A | * | 5/1996 | Niederlein et al. | 273/139 |
| 5,735,379 A | * | 4/1998 | Schulze | 194/346 |
| 5,984,779 A | * | 11/1999 | Bridgeman | 463/16 |
| 6,146,273 A | * | 11/2000 | Olsen | 463/27 |

FOREIGN PATENT DOCUMENTS

| | | | |
|---|---|---|---|
| DE | 2938307 | | 4/1981 |
| DE | 4432898 | | 9/1994 |
| DE | 19513038 | | 3/1995 |
| DE | 44 02 800 | * | 8/1995 |
| GB | 2096376 | * | 10/1982 |
| GB | 2147442 | * | 5/1985 |
| GB | 2170636 | * | 8/1986 |
| GB | 2183882 | * | 6/1987 |
| GB | 2191030 | * | 12/1987 |
| GB | 2210191 | * | 6/1989 |
| GB | 2222712 | * | 3/1990 |

* cited by examiner

*Primary Examiner*—Jessica Harrison
*Assistant Examiner*—John M Hotaling, II
(74) *Attorney, Agent, or Firm*—Horst M. Kasper

(57) ABSTRACT

Abstract of the disclosure method for the determination of a winning value upon reaching of a game result at a coin operated entertainment automat with a symbol game arrangement. Coin operated entertainment automat comprise a symbol game arrangement where the circulating bodies displays in a rest position of winning or non-winning symbol combination. The winning value associated with the displayed symbol combination can in following under danger of loss in a risk game be staked against a higher winning value. This new feature is to assure that the player always maintains a maximum game tension independent of the amount of the stake. This is accomplished in that at jackpot is continuously filled from the game stake and is present to be released at an unknown point in time. An achieved winning value can be staked in the risk game against the jackpot.

20 Claims, 1 Drawing Sheet

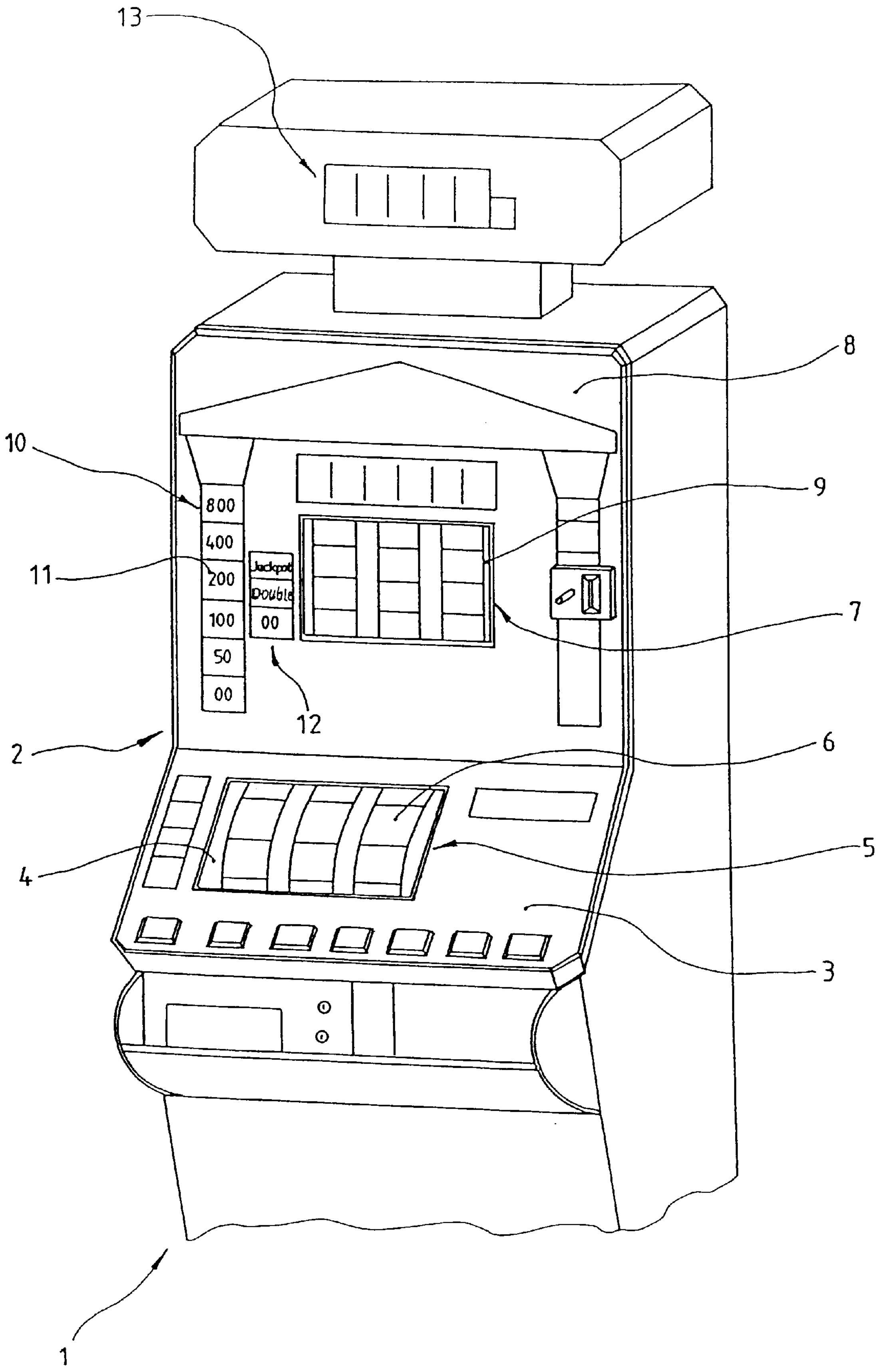
13
8
10
9
800
400
11
200
Jackpot
Double
00
7
100
50
00
12
2
6
5
4
3
1

METHOD FOR DETERMINING THE WINNING VALUE UPON REACHING OF A GAME RESULT AT A COIN OPERATED ENTERTAINMENT AUTOMAT

BACKGROUND OF THE INVENTION

1. Field of the Invention

The present invention relates to a method for determining a winning value upon reaching of a game result at a coin operated entertainment automat 2. Brief Description of the Background of the Invention A coin operated entertainment automat is known from the German printed patent document DE 2938307 A1 having a play device comprising next to each other disposed roller shaped circulating bodies with the winning symbols. Furthermore, the entertainment automat comprises a display table with the winning values, which are translucently illuminated. Upon reaching of a win bringing symbol combination. the winning achieved can be staked again under danger of loss in the display table against the next higher winning value. Based on the monotonously rising disposed winning values in the display table, this entertainment automat exhibits only a uniform game tension, which reaches its peak in the higher section region of the higher winning values. However, the higher winning values are only rarely reached.

It is an object of the present invention to furnish an entertainment automat of the kind recited such that always a maximum high game tension can be assured.

The method according to the invention for determining a winning value upon reaching of a game result at a coin operated entertainment automat is associated with the advantage that by a game stake of each play simultaneously two jackpots are filled, wherein the filling state of only one jackpot is displayed and wherein the jackpots are continuously filled with a predetermined amount of the stake of each game. The release point in time of the jackpot is unknown to the player. The jackpot can only be released through a risk game, where the playing winning value is placed against the jackpots value. The play is performed controlled by chance. If a predetermined filling state limiting value of the displayed jackpot has been reached, then the probability of the chance in the play for obtaining the jackpot value is changed to such in the risk game, that fairly soon release of the jackpot occurs. The game tension can be maintained by having in the following a random chance determining value transferred from the second covered jackpot to the displayed jackpot, such that the displayed jackpot is filled again immediately, is present for release and a thereby maintains the tension of the game.

DESCRIPTION OF INVENTION AND PREFERRED EMBODIMENT

An embodiment of the invention is presented in more detail by way of the coin operated entertainment automat illustrated in the drawing.

A coin operated entertainment automat designated with the reference numeral 1 exhibits a desk like formed front side 2 as illustrated in the drawing, wherein a view window 4 is disposed on the lower front desk region 3 of the front side 2, wherein a symbol play arrangement 5 is furnished behind the view window 4, wherein the symbol play arrangement 5 comprises three roller shaped circulating bodies 6 carrying next to each other disposed winning symbols. A second symbol play arrangement 7 is disposed in the front side region 8 disposed inclined relative to the horizontal behind a view window 9. The second symbol play arrangement 7 comprises three side by side disposed roller shaped circulating bodies furnished with winning symbols. Neighboring to the circulating bodies there's furnished a winning value display table 10, which table comprises a plurality of transparent illuminated display elements 11 disposed on top with each other like a ladder with winning values. The winning values form a nearly monotonously row. A short table 12 is formed of three display fields. A display means 13 is furnished above the second symbol game arrangement 7, by way of which the counter state of the jackpot value to be played out is displayable. The control of the display elements 11, of the display means 13 and of the symbol game arrangement 5, 7 is performed with a controlled unit not illustrated in detail including a microprocessor system.

The circulating bodies 6 of the first game arrangement 5 are placed into rotation after a credit value exhibited at the game stake and are placed to rest in a locked position previously determined by the control unit. If a winning value is coordinated to the symbol combination displayed by the resting circulating bodies 6, then in the following the circulating bodies of the second symbol game arrangement 7 are placed into rotation and are set to rest in the previously determined. random chance determined engagement positions. This winning value coordinated to the displayed symbol combination can in the following under danger of loss be risked against a next higher winning value in the winning value display table 10. Based on activation of a front side disposed operating key element the risk play can be changed from the display table 11 into the short table 12. Now the present winning can be risked in the short table 12 against double the winning value or nothing or a jackpot value.

The present jackpot value is displayed with the display means 13. The jackpot arrangement comprises a jackpot A and a jackpot B. The two jackpots are continuously filled with respective shares from the stakes of the game. The jackpot A is filled for example with 2 percent of the stake of the game and the jackpot B is filled for example with four percent of the stake of the game. The counter state of the jackpot A is continuously monitored by a control unit not illustrated in detail and in case of a surpassing of a predetermined jackpot value it is determined with a pseudorandom number generator of the control unit, if the jackpot is released.

If the jackpot is released by the risk game in the short table 12 by the random number determination then in the following it is determined by the control unit, which amount of the jackpot B is to be transferred to the jackpot A. Depending on the value of the counter state of the jackpot B it is determined by a drawing method, which amount is transferred from the jackpot B to the jackpot A.

The particular tension in connection with this jackpot system is furnished by the situation that the release point in time of the jackpot A is unknown to the user of the entertainment automat. Secondly the user of the entertainment automat is in each case surprised that after a performed release of the jackpot A, this jackpot A is immediately refilled to an attractive value and can pass practically immediately again to release.

While the invention has been illustrated and described as embodied in the context of a method for determining a winning value upon reaching of a game result at a coin operated entertainment automat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method for determining a winning value upon reaching of a game result at a coin operated entertainment automat with a symbol game arrangement for displaying winning and non-winning symbol combinations, and with a table with winning values, wherein the previously obtained winning value can be staked under danger of loss against a higher winning value, wherein the table with winning values (10) is associated to at least a second short table (12), which short table (12) exhibits display fields with jackpot or double or nothing values, wherein at least a variable winning value is coordinated to a display field of the second short table, and wherein the user has the possibility to change a risk play from the table with winning values (10) to the second short table (12).

2. The method according to claim 1 wherein the variable winning value is performed by a jackpot.

3. The method according to claim 1 wherein a proportionate amount of the respective game stake is continuously employed for filling of the jackpot.

4. The method according to claim 1 wherein at least two jackpots A, B are filled continuously, wherein the jackpot B is filled with the same, a larger or a smaller part amount as the jackpot A, and wherein the filling state of the slow or filled the jackpot A is coupled to display field of the short table (12) or of the display means (13) and wherein the jackpot A released, if a predetermined release value is surpassed, and wherein the winning value in the credit storage of the game apparatus is transferred, and wherein in the following a predetermined partial amount of the jackpot B is transferred to the jackpot A and the jackpot B is reduced to buy this amount.

5. The method according to claim 1 wherein the jackpots A, B are filled with a different proportionate amount of the game stake.

6. The method according to claim 1 wherein the value, which is transferred from the jackpot B to the jackpot A is determined by random chance within predetermined limits.

7. A method for determining a winning value upon reaching of a game result comprising furnishing a coin operated entertainment automat with a symbol game arrangement for displaying winning and non-winning symbol combinations and with a table with a winning values;

furnishing a table with winning values (10);

exhibiting winning values on the table with winning values (10);

furnishing a second short table (12) with display fields and associated to the table with winning values (10);

coordinating at least a variable winning value to a display field of the second short table (12);

exhibiting winning values on display fields of the second short table (12);

enabling a staking of a previously obtained winning value under danger of loss against a higher winning value in a risk play;

enabling a user to change a risk play from the table with winning values (10) to the second short table (12) where the risk play in the short table can be double the winning value or nothing or a jackpot value.

8. The method according to claim 7 further comprising staking a game;

displaying a symbol combination presenting the result of the game;

determining a winning value upon reaching of a game result at the coin operated entertainment automat;

simultaneously filling two jackpots by a game stake of each play, wherein the jackpots are continuously filled with a predetermined amount of the stake of each game;

displaying the filling state of only one jackpot;

maintaining a release point in time of the displayed jackpot unknown to the player;

restricting release of the jackpot to a risk game, wherein a playing winning value is placed against the jackpots value.

9. The method according to claim 8 further comprising controlling the performance of the play by chance;

determining if a predetermined filling state limiting value of the displayed jackpot has been reached;

changing the probability of a chance in the play for obtaining the jackpot value such in a risk game soon a release of the jackpot occurs;

transferring in the following a random chance determining value from the second covered jackpot to the displayed jackpot, such that the displayed jackpot is filled again immediately, and thereby the second jackpot is indirectly present for release.

10. The method according to claim 7 further comprising furnishing a symbol play arrangement behind a view window of a coin operated entertainment automat exhibiting a desk like formed front side, wherein the view window is disposed on a lower front desk region of a front side, wherein the symbol play arrangement comprises three roller shaped circulating bodies carrying next to each other disposed winning symbols;

furnishing a second symbol play arrangement in a front side region disposed inclined relative to the horizontal behind a second view window, wherein the second symbol play arrangement comprises three side by side disposed roller shaped circulating bodies furnished with winning symbols;

furnishing a winning value display table disposed neighboring to the roller shaped circulating bodies, which a winning value display table comprises a plurality of transparent illuminated display elements disposed on top with each other like a ladder with winning values, wherein the winning values form a nearly monotonously row.

11. The method according to claim 10 further comprising forming a short table of three display fields;

furnishing a display means above the second symbol play arrangement;

displaying with the display means a counter state of the jackpot value to be played out;

controlling display elements of the display means and of the symbol game arrangement.

12. The method according to claim 9 further comprising exhibiting a credit value at a game stake;

placing the circulating bodies of the first game arrangement into rotation;

determining a locked position for the circulating bodies with a control unit;

putting the circulating bodies to rest in the locked position;

determining if a winning value is coordinated to the symbol combination displayed by the resting circulating bodies and if a winning value is coordinated, then placing second circulating bodies of a second symbol game arrangement into rotation and setting the second circulating bodies to rest in previously determined random chance determined engagement positions.

13. The method according to claim 12 further comprising permitting to risk this winning value coordinated to the displayed symbol combination in the following under danger of loss against a next higher winning value in the winning value display table;

activating a front side disposed operating key element and thereby changing a risk play from the display table into a short table;

risking the present winning in the short table against double the winning value or nothing or a jackpot value.

14. The method according to claim 7 further comprising continuously filling a first jackpot and a second jackpot with respective shares from the stakes of the game, wherein the variable winning value is the value of the first jackpot;

displaying the first jackpot value a display means;

monitoring a counter state of the first jackpot continuously by a control unit;

determining upon a surpassing of a predetermined jackpot value with a pseudo-random number generator of the control unit, if the jackpot is to be released.

15. The method according to claim 14 further comprising determining by the control unit if the jackpot is released by the risk game in the short table by the random number determination;

determining by the control unit, which amount of the second jackpot is to be transferred to the first jackpot;

determining by a drawing method, which amount is transferred from the second jackpot to the first jackpot, depending on the value of the counter state of the second jackpot.

16. The method according to claim 15 further comprising keeping a release point in time of the first jackpot unknown to the user of the entertainment automat;

immediately refilling the first jackpot to an attractive value after a performed release of the first jackpot;

allowing the first jackpot to pass practically immediately again to a release.

17. The method according to claim 7 further comprising determining if a winning value is coordinated to the symbol combination displayed by the resting circulating bodies and if a winning value is coordinated, then placing second circulating bodies of a second symbol game arrangement into rotation and setting the second circulating bodies to rest in previously determined random chance determined engagement positions.

18. A coin operated entertainment automat comprising a desk like formed front side;

a first view window disposed on a lower front desk region of the front side;

a first symbol play arrangement furnished behind the first view window, wherein the first symbol play arrangement comprises first roller shaped circulating bodies carrying winning symbols disposed next to each other;

a second view window;

a second symbol play arrangement disposed in the front side region disposed inclined relative to a horizontal behind the second view window, wherein the second symbol play arrangement comprises side by side disposed second roller shaped circulating bodies furnished with winning symbols;

a winning value display table furnished neighboring to the circulating bodies, which winning value display table comprises a plurality of transparent illuminated display elements disposed on top with each other like a ladder with winning values and wherein the winning values form a nearly monotonously row;

a display means furnished above the second symbol play arrangement, wherein the counter state of the jackpot value to be played out is displayable with the display means;

a control unit including a microprocessor system is connected to display elements of the display means and to the first symbol play arrangement and to the second symbol play arrangement; wherein the circulating bodies of the first game arrangement are placed into rotation after a credit value is exhibited at the game stake and are placed to rest in a locked position previously determined by the control unit;

wherein in case a winning value is coordinated to the symbol combination displayed by the resting first circulating bodies, then in the following the second circulating bodies of the second symbol game arrangement are placed into rotation and are set to rest in the previously determined random chance determined engagement positions;

wherein this winning value of the first circulating bodies and coordinated to the displayed symbol combination can in the following and under danger of loss be risked against a next higher winning value in the winning value display table;

a short table formed of a plurality of display fields for risk games;

a front side disposed operating key element to be operated upon a winning value displayed on the display table is capable of changing a risk play from the display table into the short table and now the present winning can be risked in the short table against double the winning value or nothing or a jackpot value.

19. The coin operated entertainment automat according to claim 18, further comprising display means connected to the control unit;

a first jackpot displayed with the display means;

a second jackpot, wherein the two jackpots are continuously filled with respective shares from the stakes of the game and wherein the counter state of the first jackpot is continuously monitored by the control unit and wherein in case of a surpassing of a predetermined jackpot value it is determined with a pseudo-random number generator of the control unit, if the jackpot is to be released.

20. The coin operated entertainment automat according to claim 19, wherein in case the jackpot is released by the risk game in the short table by the random number determination then in the following it is determined by the control unit, which amount of the second jackpot is to be transferred to the first jackpot, and wherein, depending on the value of the counter state of the second jackpot, it is determined by a drawing method, which amount is to be transferred from the second jackpot to the first jackpot.

* * * * *